(12) United States Patent
Nozaki et al.

(10) Patent No.: US 7,244,209 B2
(45) Date of Patent: Jul. 17, 2007

(54) HYDRAULIC CONTROL DEVICE FOR AUTOMATIC TRANSMISSION

(75) Inventors: Kazutoshi Nozaki, Nisshin (JP); Masami Kondo, Toyota (JP); Kazuyuki Noda, Handa (JP); Takuya Fujimine, Hamamatsu (JP); Minoru Todo, Takahama (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 213 days.

(21) Appl. No.: 11/192,028

(22) Filed: Jul. 29, 2005

(65) Prior Publication Data

US 2006/0025281 A1 Feb. 2, 2006

(30) Foreign Application Priority Data

Jul. 30, 2004 (JP) ............................. 2004-224802

(51) Int. Cl.
*F16H 61/12* (2006.01)
*F16H 61/18* (2006.01)

(52) U.S. Cl. ...................................... 475/119; 475/122

(58) Field of Classification Search ................ 475/119, 475/122, 133
See application file for complete search history.

(56) References Cited

U.S. PATENT DOCUMENTS 6,102,826 A * 8/2000 Takahashi et al. .......... 475/119
6,464,610 B1 * 10/2002 Hisano et al. .............. 475/119
6,929,584 B2 * 8/2005 Miyata et al. .............. 477/119
2005/0003921 A1 * 1/2005 Morise et al. .............. 475/116

FOREIGN PATENT DOCUMENTS

JP 2000-249219 9/2000

* cited by examiner

*Primary Examiner*—Sherry Estremsky
*Assistant Examiner*—Edwin A. Young
(74) *Attorney, Agent, or Firm*—Oblon, Spivak, McClelland, Maier & Neustadt, P.C.

(57) ABSTRACT

A hydraulic control apparatus for an automatic transmission including two frictional coupling devices of a first group and a plurality of frictional coupling devices of a second group, the control device including a second-group-engaging switching valve arranged to receive second engaging hydraulic pressures generated to engage the coupling devices of the second group and operable, upon reception of at least one of the second engaging hydraulic pressures, to generate a second-group-engaging pilot hydraulic pressure, and a fail-safe valve to receive at least one of first engaging hydraulic pressures generated to engage the two coupling devices of the first group and operable, upon simultaneous reception of the first engaging hydraulic pressure generated to engage one of the two coupling devices of the first group and the second-group-engaging pilot hydraulic pressure, to prevent application of the first engaging hydraulic pressure to the other of the two coupling devices of the first group.

13 Claims, 8 Drawing Sheets

|      | C1 | C2 | C3 | C4 | B1 | B2  | F1 |
|------|----|----|----|----|----|-----|----|
| P    |    |    |    |    |    |     |    |
| Rev1 |    |    | O  |    |    | O   |    |
| Rev2 |    |    |    | O  |    | O   |    |
| N    |    |    |    |    |    |     |    |
| 1st  | O  |    |    |    |    | (O) | O  |
| 2nd  | O  |    |    |    | O  |     |    |
| 3rd  | O  |    | O  |    |    |     |    |
| 4th  | O  |    |    | O  |    |     |    |
| 5th  | O  | O  |    |    |    |     |    |
| 6th  |    | O  |    | O  |    |     |    |
| 7th  |    | O  | O  |    |    |     |    |
| 8th  |    | O  |    |    | O  |     |    |

| SHIFT RANGE | GEAR POSITIONS AVAILABLE |
|---|---|
| D | 1,2,3,4,5,6,7,8 |
| 7 | 1,2,3,4,5,6,7 |
| 6 | 1,2,3,4,5,6 |
| 5 | 1,2,3,4,5 |
| 4 | 1,2,3,4 |
| 3 | 1,2,3 |
| 2 | 1,2 |
| L | 1 |

SHIFT-UP ↑
↓ SHIFT-DOWN

HYDRAULIC CONTROL DEVICE FOR AUTOMATIC TRANSMISSION

This application is based on Japanese Patent Application No. 2004-224802 filed Jul. 30, 2004, the contents of which are incorporated hereinto by reference.

BACKGROUND OF THE INVENTION

1. Field of the Invention

The present invention relates in general to a hydraulic control apparatus for an automatic transmission, and more particularly to techniques associated with a fail-safe arrangement to prevent interlocking of simultaneous engaging actions of some combinations of frictional coupling devices provided in the automatic transmission.

2. Discussion of Related Art

There is known an automatic transmission which includes two hydraulically operated frictional coupling devices of a first group and a plurality of hydraulically operated frictional coupling devices of a second group, and which is arranged to establish a selected one of a plurality of gear positions having respective different speed ratios, by simultaneous engaging actions of one of the frictional coupling devices of the first group and one of the frictional coupling devices of the second group. JP-2000-249219A discloses an example of this type of automatic transmission, wherein a clutch C1 and a clutch C2 constitutes the first group, while a clutch C3 and brakes B1 and B2 constitutes the second group. This automatic transmission is placed in one of first through third gear positions by simultaneous engaging actions of the clutch C1 of the first group and one of the clutch C3 and brakes B1, B2 of the second group, in a fourth gear position by simultaneous engaging actions of the two clutches C1 and C2 of the first group, and in one of fifth and sixth gear positions by simultaneous engaging actions of the clutch C2 of the first group and one of the clutch C3 and brake B1 of the second group.

The publication JP-2000-249219A also discloses a technical arrangement for preventing so-called "interlocking" of simultaneous engaging actions of some combinations of the hydraulically operated frictional coupling devices. This technical arrangement includes (a) a composite-pilot-signal valve operable to generate a pilot hydraulic pressure when the composite-pilot-signal valve receives engaging hydraulic pressures simultaneously generated to engage the two hydraulically operated frictional coupling devices (C1, C2) of the first group, and (b) a fail-safe valve 120 which is arranged to receive engaging hydraulic pressures generated to engage the plurality of hydraulically operated frictional coupling devices (C3, B1, B2) of the second group and the above-indicated pilot hydraulic pressure, and which is operable to prevent application of the engaging hydraulic pressure to a selected one of the frictional coupling devices when the at least two of the pilot hydraulic pressure and the engaging hydraulic pressures generated to engage the frictional coupling devices of the second group. The fail-safe valve cooperates with the composite-pilot-signal valve to prevent the interlocking of the simultaneous engaging actions of the two or more frictional coupling devices which are not normally available due to speed differences of the rotary elements associated with the frictional coupling devices in question but abnormally take place due to an electric failure or defect of solenoid valves or an operational failure or defect of the solenoid valves such as sticking of their spools (operational abnormality due to a foreign matter caught in the valve structure). The solenoid valves are provided to apply and remove the engaging hydraulic pressures to and from the frictional coupling devices. The above-indicated simultaneous engaging actions which cause the interlocking are those of the frictional coupling devices for establishing different gear positions of the automatic transmission. The interlocking would cause an undesirable variation of an output drive force of the automatic transmission, or an excessively large load acting on the friction members of the frictional coupling devices, which results in deterioration of the durability of the friction members.

However, the conventional technical arrangement for preventing the interlocking is arranged such that the fail-safe valve receives the engaging hydraulic pressures of the plurality of hydraulically operated frictional coupling devices of the second group, and therefore undesirably suffers from a relatively large number of hydraulic ports of the fail-safe valve, and an accordingly increased required diameter or length of the fail-safe valve. Therefore, the fail-safe valve tends to have a relatively large sliding resistance of its spool and suffer from an accordingly deteriorated operating response and an accordingly reduced resistance to sticking of its spool. These problems are serious where the number of the frictional coupling device of the second group is relatively large for establishing a relatively large number of the gear positions of the automatic transmission.

SUMMARY OF THE INVENTION

It is therefore an object of the present invention to provide a hydraulic control apparatus for an automatic transmission, which permits reduction of the required number of the hydraulic ports of the fail-safe valve, and an increased resistance to sticking of its spool and an increased operating response.

The above object may be achieved according to any one of the following modes of this invention. It is to be understood that the present invention is not limited to the technical features or any combinations thereof which will be described for illustrative purpose only. It is to be understood that a plurality of elements or features included in any one of the following modes of the invention are not necessarily provided all together, and that the invention may be embodied without some of the elements or features described with respect to the same mode.

(1) A hydraulic control apparatus for controlling an automatic transmission which includes two hydraulically operated frictional coupling devices of a first group and a plurality of hydraulically operated frictional coupling devices of a second group, and which is arranged to establish a selected one of a plurality of gear positions thereof having respective different speed ratios, by simultaneous engaging actions of the two frictional coupling devices of the first group, or simultaneous engaging actions of one of the frictional coupling devices of the first group and one of the frictional coupling devices of the second group, the hydraulic control apparatus comprising: (a) a second-group-engaging switching valve which is arranged to receive a plurality of second engaging hydraulic pressures generated to respectively engage the plurality of hydraulically operated frictional coupling devices of the second group and which is operable, upon reception of at least one of the second engaging hydraulic pressures, to generate a second-group-engaging pilot hydraulic pressure other than the above-indicated at least one of the second engaging hydraulic pressures, and (b) a fail-safe valve which is arranged to receive at least one of two first engaging hydraulic pressures generated to respectively engage the two hydraulically operated frictional coupling devices of the first group and which is operable, upon simultaneous reception of the first engaging hydraulic pressure generated to engage one of the two frictional coupling devices of the first group and the second-group-engaging pilot hydraulic pressure, to prevent application of the first engaging hydraulic pressure to the other of the two frictional coupling devices of the first group.

In the hydraulic control apparatus according to the above-described mode (1) of this invention, the second-group-engaging switching valve is arranged to receive the second engaging hydraulic pressures generated to respectively engage the hydraulically operated frictional coupling devices of the second group, and to generate the second-group-engaging pilot hydraulic pressure to be applied to the fail-safe valve when at least one of those second engaging hydraulic pressures is received by the second-group-engaging switch valve. When the fail-safe valve simultaneously receives the second-group-engaging pilot hydraulic pressure and the first engaging hydraulic pressure generated to engage one of the two hydraulically operated frictional coupling devices of the first group, the fail-safe valve is operated to prevent application of the first engaging hydraulic pressure to the other of the two frictional coupling devices of the first group, for thereby preventing interlocking of the simultaneous engaging actions of the above-indicated other frictional coupling device of the first group and at least one of the frictional coupling devices of the second group.

All of the second engaging hydraulic pressures generated to engage the frictional coupling devices of the second group are applied to the second-group-engaging switching valve, while only the second-group-engaging pilot hydraulic pressure is applied to the fail-safe valve, without application of any of the second engaging hydraulic pressures to the fail-safe valve. Accordingly, the number of the required ports of the fail-safe valve is relatively small, whereby the required diametric dimension and/or axial length of the fail-safe valve can be reduced, with a result of reduction of the sliding resistance of its spool and consequent improvement of its operating response and increased resistance to sticking of its spool. Although the second-group-engaging switching valve is required in addition to the fail-safe valve, these valves are operated independently of each other according to the different hydraulic pressures, so the required diameter and axial length of each valve can be reduced, whereby the fail-safe arrangement including these two valves has an improved operating response and an increased resistance to the sticking of the spools. Further, the fail-safe valve can be used for different configurations of the automatic transmission which have respective different numbers of the gear positions and respective different numbers of the hydraulically operated frictional coupling devices, so that the cost of manufacture of the hydraulic control apparatus including the fail-safe device can be reduced.

The hydraulic control apparatus according to the present invention is preferably applicable to a vehicular automatic transmission of a planetary-gear type including a plurality of planetary gear sets rotary elements of which are selectively connected to each other or fixed to a stationary member by the plurality of hydraulically operated frictional coupling devices, to selectively establish the gear positions. Each of the hydraulically operated frictional coupling devices of the automatic transmission may be a multiple-disc or single-disc type clutch or brake, or a belt type brake, which is engaged by a hydraulic actuator and commonly used for an automatic transmission. An oil pump provided to deliver a pressurized working fluid for engaging the frictional coupling device may be driven by a vehicle drive source such as an engine, or an electric motor exclusively provided to drive the oil pump.

Each of the hydraulically operated frictional coupling devices is engaged and released by application and removal of the engaging hydraulic pressure to and from the hydraulic actuator under the control of a shifting solenoid valve. Preferably, the engaging hydraulic pressure applied to the hydraulic actuator is continuously varied. The shifting solenoid valve is preferably a linear solenoid valve having a solenoid valve, so that the engaging hydraulic pressure generated by the linear solenoid valve is continuously varied by continuously changing an amount of electric current applied to the solenoid coil. However, the shifting solenoid valve may be an ON-OFF solenoid valve the duty ratio or cycle of which is controlled to control the engaging hydraulic pressure. While the engaging hydraulic pressure as generated by the linear solenoid valve or ON-OFF solenoid valve may be directly applied to the hydraulic actuator of the hydraulically operated frictional coupling device, the hydraulic pressure generated by the solenoid valve may be used to control a suitable control valve the output pressure of which is applied as the engaging hydraulic pressure to the frictional coupling device.

(2) The hydraulic control apparatus according to the above-described mode (1), wherein the plurality of hydraulically operated frictional coupling devices of the second group consist of at least three frictional coupling devices including at least one frictional coupling device an engaging action of which simultaneously with engaging actions of the two hydraulically operated frictional coupling devices of the first group would cause interlocking of the simultaneous engaging actions of the above-indicated at least one frictional coupling device of the second group and the two hydraulically operated frictional coupling devices of the first group, the second-group-engaging switching valve generating the second-group-engaging pilot hydraulic pressure when the second-group-engaging switch valve receives at least one of at least three second engaging hydraulic pressures generated to respectively engage the at least three frictional coupling devices of the second group.

In the hydraulic control apparatus according to the above-described mode (2), the second group of hydraulically operated frictional coupling devices consists of at least three frictional coupling devices, but only the second-group-engaging pilot hydraulic pressure generated by the second-group-engaging switching valve is applied to the fail-safe valve, that is, none of the second engaging hydraulic pressures generated to engage the at least three frictional coupling devices of the second group is applied to the fail-safe valve, so that the number of the required input ports of the fail-safe valve is reduced, whereby the diameter and axial length of the fail-safe valve can be reduced.

(3) The hydraulic control apparatus according to the above-described mode (1) or (2), wherein the fail-safe valve prevents the application of the first engaging hydraulic pressure to the above-indicated other of the two frictional coupling devices of the first group, for releasing this other frictional coupling device, when the first engaging hydraulic pressure generated to engage the above-indicated one of the two frictional coupling devices of the first group and the second-group-engaging pilot hydraulic pressure are simultaneously applied to the fail-safe valve while the first engaging hydraulic pressure is generated to engage the above-indicated other frictional coupling device of the first group and applied to the fail-safe device.

The fail-safe valve provided in the hydraulic control apparatus according to the above-described mode (3) is arranged to prevent the application of the first engaging hydraulic pressure to the above-indicated other frictional coupling device of the first group, for releasing this other frictional coupling device, when the first engaging hydraulic pressure generated to engage the above-indicated one frictional coupling device of the first group and the second-group-engaging pilot hydraulic pressure are simultaneously applied to the fail-safe valve while the first engaging hydraulic pressure generated to engage the above-indicated other frictional coupling device of the first group is applied to the fail-safe device. This arrangement prevents interlocking of the simultaneous engaging actions of the two frictional coupling devices of the first group and at least one of the frictional coupling devices of the second group.

(4) The hydraulic control apparatus according to any one of the above-described modes (1)-(3), wherein the plurality of gear positions of the automatic transmission include first through eighth gear positions, and the above-indicated other of the two hydraulically operated frictional coupling devices of the first group is a first clutch which is engaged to establish the first through fifth gear positions, and the above-indicated one of the two hydraulically operated frictional coupling devices of the first group is a second clutch which is engaged to establish the fifth through eighth gear positions, while the plurality of hydraulically operated frictional coupling devices of the second group include at least a third clutch which is engaged to establish the third and seventh gear positions, a fourth clutch which is engaged to establish the fourth and sixth gear positions, and a first brake which is engaged to establish the second and eighth gear positions.

(5) The hydraulic control apparatus according to any one of the above-described modes (1)-(4), wherein the fail-safe valve is connected to the above-indicated other of the two hydraulically operated frictional coupling devices of the first group, and has an input port for receiving the first engaging hydraulic pressure generated to engage the above-indicated other frictional coupling device, an output port through which the received first engaging hydraulic pressure is applied to the above-indicated other frictional coupling device, and a drain port for draining the received first engaging hydraulic pressure, the fail-safe valve being switchable between a normal state in which the input port and the output port are held in communication with each other for permitting the application of the received first engaging hydraulic pressure to the above-indicated other frictional coupling device while the drain port is not held in communication with the output port, and a fail-safe state in which the output port and the drain port are held in communication with each other for draining the received first engaging hydraulic pressure to release the other frictional coupling device while the input port is not held in communication with the output port. The fail-safe valve may include a spool which is movable in one of opposite axial directions to establish the normal state, and in the other axial direction to establish the fail-safe state.

(6) The hydraulic control apparatus according to the above-indicated mode (5), wherein the fail-safe valve includes a spool movable in opposite first and second axial directions, and biasing means (e.g., a spring or a device operable to generate a hydraulic pressure such as the line pressure PL) for biasing said spool in the first axial direction, and has a switching input port for receiving the first engaging hydraulic pressure generated to engage the above-indicated one of the two hydraulically operated frictional coupling devices of the first group, such that the received first engaging pressure acts on the spool in the second axial direction, and a pilot-pressure input port for receiving the second-group-engaging pilot hydraulic pressure such that the received second-group-engaging pilot hydraulic pressure acts on the spool in the second direction, the fail-safe valve being normally held in the normal state under a biasing action of the biasing means, and switched to the fail-safe state upon a movement of the spool in the second direction against the biasing action of the biasing means, for example, when the first engaging hydraulic pressure generated to engage the above-indicated one of the two frictional coupling devices of the first group and the second-group-engaging pilot hydraulic pressure are simultaneously applied to the fail-safe valve while the first engaging hydraulic pressure generated to engage the above-indicated other frictional coupling device of the first group is applied to the fail-safe device, as described above with respect to the mode (3). The spool has pressure-receiving portions which receive the above-indicated. switching input port and pilot-pressure port and which have respective different diametric dimensions, for example, such that the first engaging hydraulic pressure and pilot hydraulic pressure received by the pressure-receiving portions act on the spool in the second direction.

(7) The hydraulic control apparatus according to the above-described mode (3), wherein said fail-safe device has a spool movable in opposite first and second axial directions and is arranged to receive the first engaging hydraulic pressure generated to engage said other of said two hydraulically operated frictional coupling devices of the first group in addition to the first engaging hydraulic pressure generated to engage said one of said two hydraulically operated frictional coupling devices of the first group and said second-group-engaging pilot hydraulic pressure, said spool of said fail-safe valve being moved in said second axial direction to place said fail-safe valve in a fail-safe state to prevent the application of the first engaging hydraulic pressure to said other frictional coupling device of the first group, when said fail-safe valve simultaneously receives the first engaging hydraulic pressures generated to engage said one and other frictional coupling devices of the first group and said second-group-engaging pilot hydraulic pressure.

(8) The hydraulic control apparatus according to any one of the above-described modes (1), (2) and (4)-(6), wherein the fail-safe device has a spool movable in opposite first and second axial directions and is arranged to receive the first engaging hydraulic pressure generated to engage the above-indicated one of the two hydraulically operated frictional coupling devices of the first group and the second-group-engaging pilot hydraulic pressure, the spool of the fail-safe valve being moved in the second axial direction to place the fail-safe valve in a fail-safe state to prevent the application of the first engaging hydraulic pressure to the above-indicated other frictional coupling device of the first group, irrespective of whether the first engaging hydraulic pressure is generated to engage the above-indicated other frictional coupling device of the first group or not, when the fail-safe valve simultaneously receives the first engaging hydraulic pressures generated to engage the above-indicated one frictional coupling devices of the first group and the second-group-engaging pilot hydraulic pressure. When the first engaging hydraulic pressure to engage the above-indicated other frictional coupling device of the first group is not generated, this other frictional coupling device is in the released state. In the released state of the above-indicated other frictional coupling device, therefore, the fail-safe valve need not be placed in the fail-safe state. In other words, the fail-safe valve is required to be placed in the fail-safe state only when the first frictional coupling device to engage the above-indicated other frictional coupling device is generated, that is, only when this frictional coupling device is engaged.

Thus, the fail-safe valve is required to receive at least the first engaging hydraulic pressure generated to engage the above-indicated one frictional coupling device of the first group and the second-group-engaging pilot hydraulic pressure. Of course, the spool of the fail-safe valve may receive any other hydraulic pressure such as the first engaging hydraulic pressure generated to engage the above-indicated other frictional coupling device of the first group. In essence, the fail-safe valve is required to be placed in the fail-safe state to release the above-indicated other frictional coupling device of the first group when the fail-safe valve simultaneously receives the first engaging hydraulic pressure generated to engage the above-indicated one frictional coupling device and the second-group pilot hydraulic pressure. When the first engaging hydraulic pressure to engage the above-indicated other frictional coupling device is not generated, the fail-safe valve may be placed in either the normal state or the fail-safe state. When the first engaging hydraulic pressure to engage the above-indicated other frictional coupling device is generated, the fail-safe device must be placed in the fail-safe state to prevent the application of the first engaging hydraulic pressure to the above-indicated other frictional coupling device.

(9) The hydraulic control apparatus according to any one of the above-described modes (1)-(8), wherein the second-group-engaging switching valve has an input port for receiving an input hydraulic pressure, an output port through which the received input hydraulic pressure is applied as the second-group-engaging pilot hydraulic pressure to the fail-safe valve, and a drain port or draining the received input hydraulic pressure, the second-group-engaging switching valve being switchable between a pilot-pressure generating state in which the input port and the output port are held in communication with each other to apply the second-group-engaging pilot hydraulic pressure to the fail-safe valve while the drain port is not held in communication with the output port, and a pilot-pressure non-generating state in which the output port and the drain port are held in communication with each other for draining the second-group-engaging pilot hydraulic pressure while the input port is not held in communication with the output port. The input hydraulic pressure may be a line pressure, a hydraulic pressure generated by a manual valve (operatively connected to a shift lever for shifting the automatic transmission), or a hydraulic pressure generated by a modulator valve. The fail-safe valve may include a spool which is movable in one of opposite axial directions to establish the pilot-pressure generating state, and in the other axial direction to establish the pilot-pressure non-generating state.

(10) The hydraulic control apparatus according to the above-described mode (9), wherein the second-group-engaging switching valve includes a spool movable in opposite first and second axial directions, and biasing means for biasing the spool in the first axial direction, and has a plurality of switching input ports for receiving the plurality of second engaging hydraulic pressures such that the received second engaging hydraulic pressures act on the spool in the first axial direction, and an input-pressure port for receiving the input hydraulic pressure such that the received input hydraulic pressure acts on the spool in the second axial direction, the second-group-engaging switching valve being switched to the pilot-pressure non-generating state with a movement of the spool in the second axial direction by a biasing force of the biasing means when none of the second engaging hydraulic pressures is applied to the second-group-engaging switching valve, and switched to the pilot-pressure generating state with a movement of the spool in the first axial direction against the biasing force of the biasing means when at least one of the second engaging hydraulic pressures is applied to the second-group-engaging switching valve. The spool has pressure-receiving portions which receive the above-indicated switching input ports and which have respective different diametric dimensions, for example, such that the second engaging hydraulic pressures received by the pressure-receiving portions act on the spool in the first direction.

The second-group-engaging switching valve is required to receive the plurality of second engaging hydraulic pressures generated to engage the hydraulically operated frictional coupling devices of the second group, and may be arranged to receive any other hydraulic pressure, as long as the switching valve is switched from the pilot-pressure non-generating state to the pilot-pressure generating state, with the spool being moved in the first axial direction when at least one of the second engaging hydraulic pressures is applied to the switching input port or ports.

The second-group-engaging switching valve is preferably arranged to receive all of the plurality of second engaging hydraulic pressures corresponding to the respective frictional coupling devices of the second group. Where the second group includes a frictional coupling device which is engaged only when an engine brake or any other drive-power-source brake is applied to the vehicle, the switching valve need not receive the second engaging hydraulic pressure corresponding to this frictional coupling device, since the frequency of the engaging action of this frictional coupling device is low, and the possibility of interlocking of the simultaneous engaging actions of this frictional coupling device and one of the two frictional coupling devices of the first group is accordingly low.

Where the second group consists of a relatively large number of hydraulically operated frictional coupling devices, these frictional coupling devices of the second group are grouped into a plurality of sub-groups, and a plurality of second-group-engaging switching valves are provided so that these switching valves are arranged to receive respective sets of second engaging hydraulic pressures corresponding to the respective sub-groups of the frictional coupling devices of the second group. In this case, the switching valves are connected to the fail-safe valve such that the second-group-engaging pilot hydraulic pressure generated by each switching valve is applied to the fail-safe device.

The first engaging hydraulic pressures to be applied to the fail-safe valve and the second engaging hydraulic pressures to be applied to the second-group-engaging switching valve are hydraulic pressures to be applied to the hydraulic actuators of the hydraulically operated frictional coupling devices. Where the hydraulic actuators are supplied with hydraulic pressures controlled by respective control valves which are operated according to output hydraulic pressures received from shifting solenoid valves, these output hydraulic pressures of the shifting solenoid valves may be used as the first and second engaging hydraulic pressures. In essence, any hydraulic pressures which vary depending upon the operating states of the shifting solenoid valves to selectively engage and release the frictional coupling devices may be used as the engaging hydraulic pressures to be applied to the fail-safe valve and the switching valves.

Although the second clutch is the above-indicated one of the two hydraulically operated frictional coupling devices of the first group, while the first clutch is the above-indicated other frictional coupling device of the first group, the first and second clutches may be respectively the above-indicated one and other of the two frictional coupling devices of the first group.

(11) The hydraulic control apparatus according to the above-described mode (4), wherein the automatic transmission includes (a) a first transmission portion constituted principally by a first planetary gear set having a first sun gear, a first carrier and a first ring gear, and (b) a second transmission portion constituted principally by a second planetary gear set having a second sun gear, a second carrier and a second ring gear, and a third planetary gear set having a third sun gear, a third carrier and a third ring gear, and wherein one of the first sun gear, first carrier and first ring gear is fixed to a stationary member, and another of the first sun gear, first carrier and first ring gear is fixed to an input member of the automatic transmission, while a remainder of the first sun gear, first carrier and first ring gear functioning as a decelerating output member a speed of which is reduced with respect to a speed of the input member, selected ones of the second and third sun gears, the second and third carriers and the second and third ring gears being connected to each other so as to provide first through fourth rotary elements, the first rotary element being selectively fixed to the stationary member through the first brake, the second rotary element being selectively fixed to the stationary member through a second brake which is engaged to establish the first gear position, the fourth rotary element being selectively connected to the decelerating output member through the first clutch, the second rotary element being selectively connected to the input member through the second clutch, the first rotary element being selectively connected to the decelerating output member through the third clutch and selectively connected to the input member through the fourth clutch, the third rotary element being fixed to the decelerating output member. A one-way clutch which permits forward rotation of the second rotary element (in the direction of rotation of the input member) and inhibits reverse rotation of the second rotary element may be disposed in parallel with the second brake, or in place of the second brake where the application of the drive-power-source brake to the vehicle is not required.

In the automatic transmission described above with respect to the above-described mode (11), the first gear position having the highest speed ratio (=rotating speed of the input member/rotating speed of the output member) is established by engaging the first clutch and the second clutch, and the second gear position the speed ratio of which is lower than that of the first gear speed is established by engaging the first clutch and the first brake. The third gear position the speed ratio of which is lower than that of the second gear position is established by engaging the first clutch and the third clutch. The fourth gear position the speed ratio of which is lower than that of the third gear position is established by engaging the first clutch and the fourth clutch, and the fifth gear position the speed ratio of which is lower than that of the fourth gear position is established by engaging the first clutch and the second clutch. The sixth gear position the speed ratio of which is lower than that of the fifth gear position is established by engaging the second clutch and the fourth clutch, and the seventh gear position the speed ratio of which is lower than that of the sixth gear position is established by engaging the second clutch and the third clutch. The eighth gear position the speed ratio of which is lower than that of the seventh gear position is established by engaging the second clutch and the first brake.

(12) The hydraulic control apparatus according to the above-described mode (11), wherein the first planetary gear set of the first transmission portion is a planetary gear set of a double-pinion type wherein one of the first sun gear and the first carrier is fixed to the stationary member and the other of the first sun and the first carrier is fixed to the input member, while the first ring gear functions as the decelerating output member the speed of which is reduced with respect to that of the input member.

The first planetary gear set of the first transmission portion may be a planetary gear set of a single-pinion type wherein one of the first sun gear and the ring gear is fixed to the stationary member, and the other of the first sun and ring gears is fixed to the input member, while the first carrier functions as the decelerating output member the speed of which is reduced with respect to that of the input member.

(13) The hydraulic control apparatus according to the above-described mode (11) or (12), wherein the second and third planetary gear sets of said second transmission portion are respectively a planetary gear set of a single-pinion type and a planetary gear set of a double-pinion type, and the first rotary element is constituted by the second sun gear of the second planetary gear set, and the second carrier of the second planetary gear set and the third carrier of the third planetary gear set are fixed to each other and cooperate to constitute the second rotary element, the second ring gear of the second planetary gear set and the third ring gear of the third planetary gear set being fixed to each other and cooperating to constitute the third rotary element, the fourth rotary element being constituted by the third sun gear of the third planetary gear set.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE PREFERRED EMBODIMENT

Figures 1A, 1B:
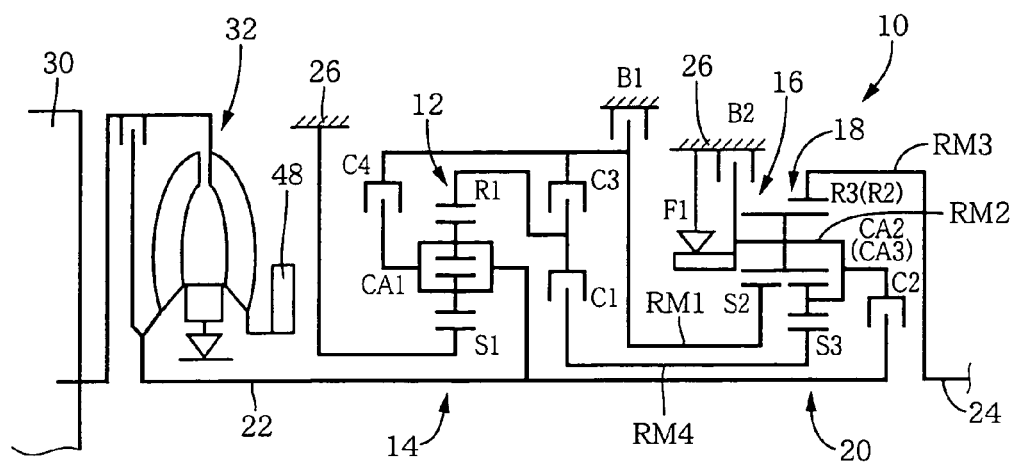
FIG. 1A is a schematic view illustrating a vehicular automatic transmission controlled by a hydraulic control apparatus constructed according to one embodiment of the present invention.
FIG. 1B is a table indicating a relationship between gear positions of the automatic transmission of FIG. 1A and combinations of operating states of hydraulically operated frictional coupling devices to establish the respective gear positions.

Referring to first to the schematic view of FIG. 1A, there is illustrated a basic arrangement of a vehicular automatic transmission 10, which is controlled by a hydraulic control apparatus according to the present invention and which is suitably used on a front-engine rear-drive vehicle (FR vehicle) such that the axial direction of the automatic transmission 10 is parallel to the longitudinal or running direction of the vehicle. As shown in FIG. 1A, the automatic transmission 10 includes a first transmission portion 14 constituted principally by a first planetary gear set 12 of a double-pinion type, and a second transmission portion 20 constituted principally by a second planetary gear set 16 of a single-pinion type and a third planetary gear set 18 of a double-pinion type. The first transmission portion 14 and the second transmission portion 20 are disposed coaxially with each other and are connected to an input shaft 14, and the second transmission portion 20 is connected to an output shaft 24, so that the speed of a rotary motion of the input shaft 22 is changed by the first and second transmission portions 14, 20, into the speed of a rotary motion of the output shaft 24. The input shaft 22, which is an input member of the automatic transmission 10, is a turbine shaft of a torque converter 32 rotated by a drive power source of the vehicle in the form of an engine 30, while the output shaft 24 is an output member of the automatic transmission 10, which is operatively connected to right and left drive wheels of the vehicle through a propeller shaft and a differential gear device (which are not shown). Since the automatic transmission 10 is constructed symmetrically with respect to its axis, the lower half of the automatic transmission 10 located below the axis is omitted in the schematic view of FIG. 1A.

The first planetary gear set 12 of the first transmission portion 14 has three rotary elements in the form of a sun gear S1, a carrier CA1 and a ring gear R1. The sun gear S1 is fixed to a transmission casing 26 such that the sun gear S1 is not rotatable relative to the transmission casing 26. The carrier CA1 is integrally fixed to the input shaft 22 and rotated with the input shaft 22, so that the speed of the ring gear R1 functioning as a decelerating output member is reduced with respect to the speed of the input shaft 22. The second and third planetary gear sets 16, 18 of the second transmission portion 20 have rotary elements some of which are fixed to each other to provide four rotary elements RM1-RM4. Described in detail, the second planetary gear set 16 has a sun gear S2 functioning as a first rotary element RM1, and a carrier CA2 which is fixed to a carrier CA3 of the third planetary gear set 18 and cooperates with this carrier CA3 to constitute a second rotary element RM2. The second planetary gear set 16 further has a ring gear R2 which is fixed to a ring gear R3 of the third planetary gear set 18 cooperates with this ring gear R3 to constitute a third rotary element RM3. The third planetary gear set 18 further has a sun gear S3 functioning as a fourth rotary element RM4. The second and third planetary gear sets 16, 18 use a single member functioning as the carrier CA2 and the carrier CA3, and another single member functioning as the ring gear R2 and the ring gear R3, and cooperate to constitute a Ravigneaux type planetary gear train wherein a pinion gear of the second planetary gear set 16 also functions as one of two pinion gears, that is, a second pinion gear.

The first rotary element RM1 (sun gear S2) is selectively fixed through a first brake B1 to the transmission casing 26, and the second rotary element RM2 (carriers CA2 and CA3) is selectively fixed through a second brake B2 to the transmission casing 26. The fourth rotary element RM4 (sun gear S3) is selectively connected through a first clutch C1 to the decelerating output member in the form of the ring gear R1 of the first planetary gear set 12, and the second rotary element RM2 (carriers CA2, CA3) is selectively connected through a second clutch C2 to the input shaft 22. The first rotary element RM1 (Sun gear S2) is selectively connected through a third clutch C3 to the decelerating output member in the form of the ring gear R1, and selectively connected through a fourth clutch C3 to the carrier CA1 of the first planetary gear set 12, that is, to the input shaft 22. The third rotary element RM3 (ring gears R2 and R3) is integrally fixed to the output shaft 24, for providing an output rotary motion. Between the second rotary element RM2 (carriers CA2, CA3) and the transmission casing 26, there is disposed a one-way clutch F1 in parallel with the second brake B2. This one-way clutch F1 permits a rotary motion of the second rotary element RM2 in the forward direction (in the direction of rotation of the input shaft 22), but inhibits a rotary motion of the second rotary element RM2 in the reverse direction.

Figure 2:
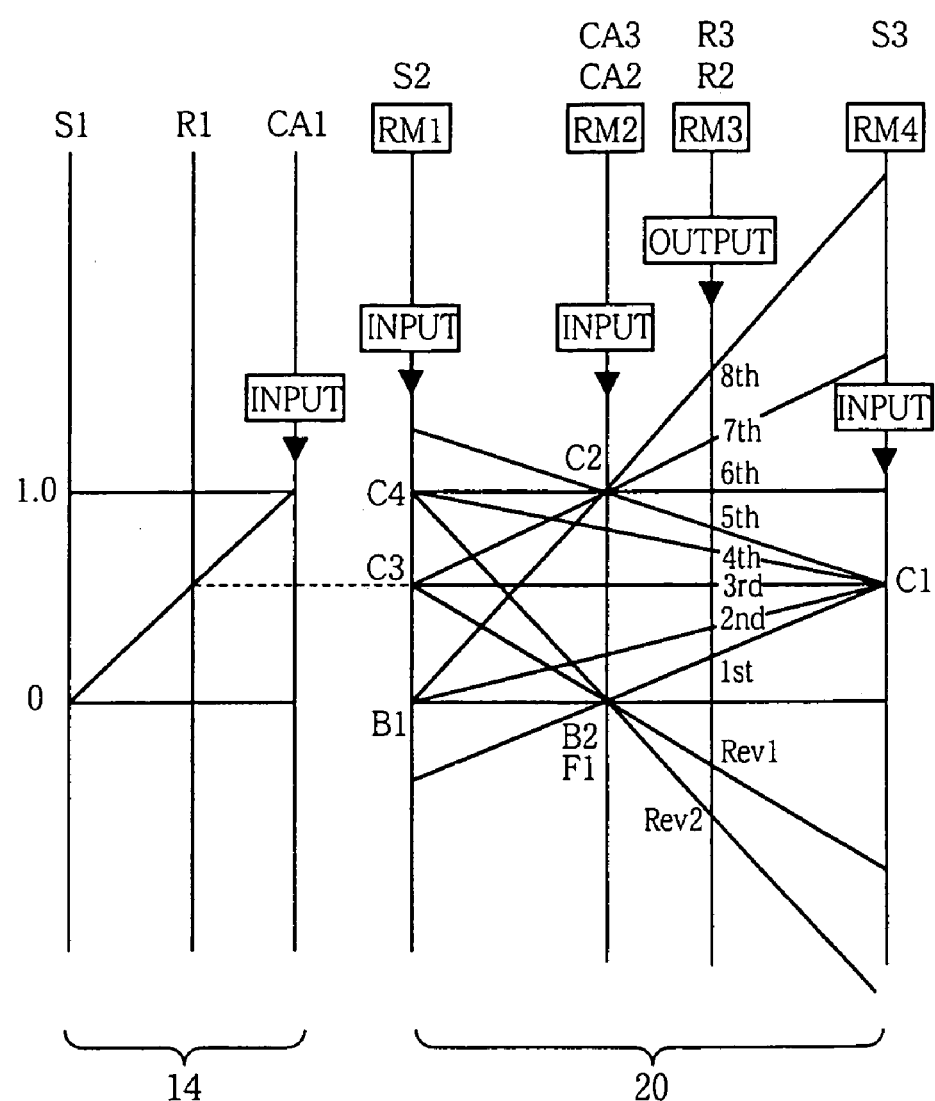
FIG. 2 is a collinear chart indicating by straight lines relative rotating speeds of a plurality of rotary elements of the vehicular automatic transmission of FIG. 1A placed in each gear position.

The collinear chart of FIG. 2 indicates, by straight lines, the rotating speed of each element of the first and second transmission portions 14, 20 in each of the gear positions of the automatic transmission 10. The collinear chart has a lower horizontal straight line indicating the speed "0", and an upper horizontal straight line indicating the speed "1.0", namely, the rotating speed of the input shaft 22. The collinear chart further has three vertical straight lines corresponding to the first transmission portion 14, and four vertical straight lines corresponding to the second transmission portion 20. The three vertical straight lines corresponding to the first transmission portion 14 respectively represent the sun gear S1, ring gear R1 and carrier CA1, in the order from the left side toward the right side. The distances between the adjacent ones of the those three vertical lines are determined by a gear ratio $\rho1$ of the first planetary gear set 12, which is a ratio of the number of teeth of the sun gear S1 to the number of teeth of the ring gear R1. The four vertical straight lines corresponding to the second transmission portion 20 respectively represent the first rotary element RM1 (sun gear S2), the second rotary element RM2 (carriers CA2, CA3), the third rotary element RM3 (ring gears R2, R3) and the fourth rotary element (sun gear S3), in the order from the left side toward the right side. The distances between the adjacent ones of those four vertical lines are determined by a gear ratio $\rho2$ of the second planetary gear set 16 and a gear. ratio $\rho3$ of the third planetary gear set 18.

As indicated in FIG. 1B, the automatic transmission 10 is placed in a first gear position "1st" when the first clutch C1 and the second brake B2 are engaged. The first gear position "1st" has a highest speed ratio (a ratio of a rotating speed $N_{IN}$ of the input shaft 22 to a rotating speed $N_{OUT}$ of the output shaft 24). In this first gear position, the fourth rotary element RM4 and the decelerating output member in the form of the ring gear R1 are rotated together at a reduced speed, while the second rotary element RM2 is held stationary, so that the output shaft 24 connected to the third rotary element RM3 is rotated at a speed represented by an inclined straight line labeled "1st" in the collinear chart of FIG. 2. When the first clutch C1 and the first brake B1 are engaged, the automatic transmission 10 is placed in a second gear position "2nd" having a speed ratio lower than that of the first gear position "1st". In the second gear position "2nd", the fourth rotary element RM4 and the ring gear R1 are rotated together at a reduced speed, while the first rotary element RM1 is held stationary, so that the third rotary element RM3 is rotated at a speed represented by an inclined straight line labeled "2nd" in the collinear chart. When the first clutch C1 and the third clutch C3 are engaged, the automatic transmission 10 is placed in a third gear position "3rd" having a speed ratio lower than that of the second gear position "2nd". In the third gear position "3rd", the second transmission portion 20 and the ring gear R1 are rotated together at a reduced speed, so that the third rotary element RM3 is rotated at a speed represented by a horizontal straight line labeled "3rd" in the collinear chart, that is, at the same speed as the ring gear R1. When the first clutch C1 and the fourth clutch C4 are engaged, the automatic transmission 10 is placed in a fourth gear position "4th" having a speed ratio lower than that of the third gear position "3rd". In the fourth gear position "4th", the fourth rotary element RM4 and the ring gear R1 are rotated together at a reduced speed, while the first rotary element RM1 and the input shaft 22 are rotated together, so that the third rotary element RM3 is rotated at a speed represented by an inclined straight line labeled "4th" in the collinear chart. When the first clutch C1 and the second clutch C2 are engaged, the automatic transmission 10 is placed in a fifth gear position "5th" having a speed ratio lower than that of the fourth speed position "4th". In the fifth gear position "5th", the fourth rotary element RM4 and the ring gear R1 are rotated together at a reduced speed, while the second rotary element RM2 and the input shaft 22 are rotated together, so that the third rotary element RM3 is rotated at a speed represented by an inclined straight line labeled "5th" in the collinear chart.

When the second clutch C2 and the fourth clutch C4 are engaged, the automatic transmission 10 is placed in a sixth gear position "6th" having a speed ratio lower than that of the fifth gear position "5th". In the sixth gear position "6th", the second transmission portion 20 and the input shaft 22 are rotated together, so that the third rotary element RM3 is rotated at a speed represented by a horizontal straight line labeled "6th" in the collinear chart, that is, at the same speed as the input shaft 22. The speed ratio of the sixth gear position "6th" is equal to 1.0. When the second clutch C2 and the third clutch C3 are engaged, the automatic transmission 10 is placed in a seventh gear position "7th" having a speed ratio lower than that of the sixth gear position "6th". In the seventh gear position "7th", the second rotary element RM2 and the input shaft 22 are rotated together, while the first rotary element RM1 and the ring gear R1 are rotated together at a reduced speed, so that the third rotary element RM3 is rotated at a speed represented by an inclined straight line labeled "7th" in the collinear chart. When the second clutch C2 and the first brake B1 are engaged, the automatic transmission 10 is placed in an eighth gear position "8th" having a speed ratio lower than that of the seventh gear position "7th". In the eighth gear-position "8th", the second rotary element RM2 and the input shaft 22 are rotated together, while the first rotary element RM1 is held stationary, so that the third rotary element RM3 is rotated at a speed represented by an inclined straight line labeled "8th" in the collinear chart. The first through eighth gear positions "1st" through "8th" are forward-drive gear positions.

When the second brake B2 and the third clutch C3 are engaged, the automatic transmission 10 is placed in a first reverse gear position "Rev1" in which the second rotary element RM2 is held stationary while the first rotary element RM1 and the ring gear R1 are rotated together at a reduced speed, so that the third rotary element RM3 is rotated in the reverse direction at a speed represented by an inclined straight line labeled "Rev1" in the collinear chart. When the second brake B2 and the fourth clutch C4 are engaged, the automatic transmission 10 is placed in a second reverse gear position "Rev2" in which the second rotary element RM2 is held stationary while the first rotary element RM1 and the input shaft 22 are rotated together, so that the third rotary element RM3 is rotated in the reverse direction at a speed represented by an inclined straight line labeled "Rev2" in the collinear chart.

The table of FIG. 1B indicates the relationship between the gear positions of the automatic transmission 10 and the respective combinations of the operating states of the clutches C1-C4 and brakes B1 and B2. In the table, "O" represents the engaged state of the clutches and brakes, while "(O)" represents the engaged state of the second brake B2 which is established to apply an engine brake to the vehicle. In the presence of the one-way clutch F1 disposed in parallel with the second brake B2 which is engaged to establish the first gear position "1st", the second brake B2 need not be engaged to start or accelerate the vehicle with the automatic transmission 10 placed in the first gear position "1st". The speed ratios of the individual gear positions are determined by the gear ratios $\rho 1$, $\rho 2$ and $\rho 3$ of the first, second and third planetary gear sets 12, 16, 18.

The above-described clutches C1-C4 and brakes B1 and B2 are hydraulically operated frictional coupling devices, each of which may be a multiple-disc clutch or brake having a plurality of mutually superposed friction plates which are forced against each other by a hydraulic actuator. The first and second clutches C1 and C2 are two hydraulically operated frictional coupling devices of a first group, while the third and fourth clutches C3 and C4 and the first and second brakes B1 and B2 are a plurality of hydraulically operated frictional coupling devices of a second group. When the two hydraulically operated frictional coupling devices C1, C2 of the first group are simultaneously engaged, the automatic transmission 10 is placed in the fifth gear position. When one (clutch C1 or C2) of the frictional coupling devices of the first group and one (clutch C3 or C4, or brake B1 or B2) of the frictional coupling devices of the second group are simultaneously engaged, the automatic transmission 10 is placed in a corresponding one of the other seven gear positions, that is, in the first, second, third, fourth, sixth, seventh or eighth gear position 1st, 2nd, 3rd, 4th, 6th, 7th, 8th.

Figure 3:
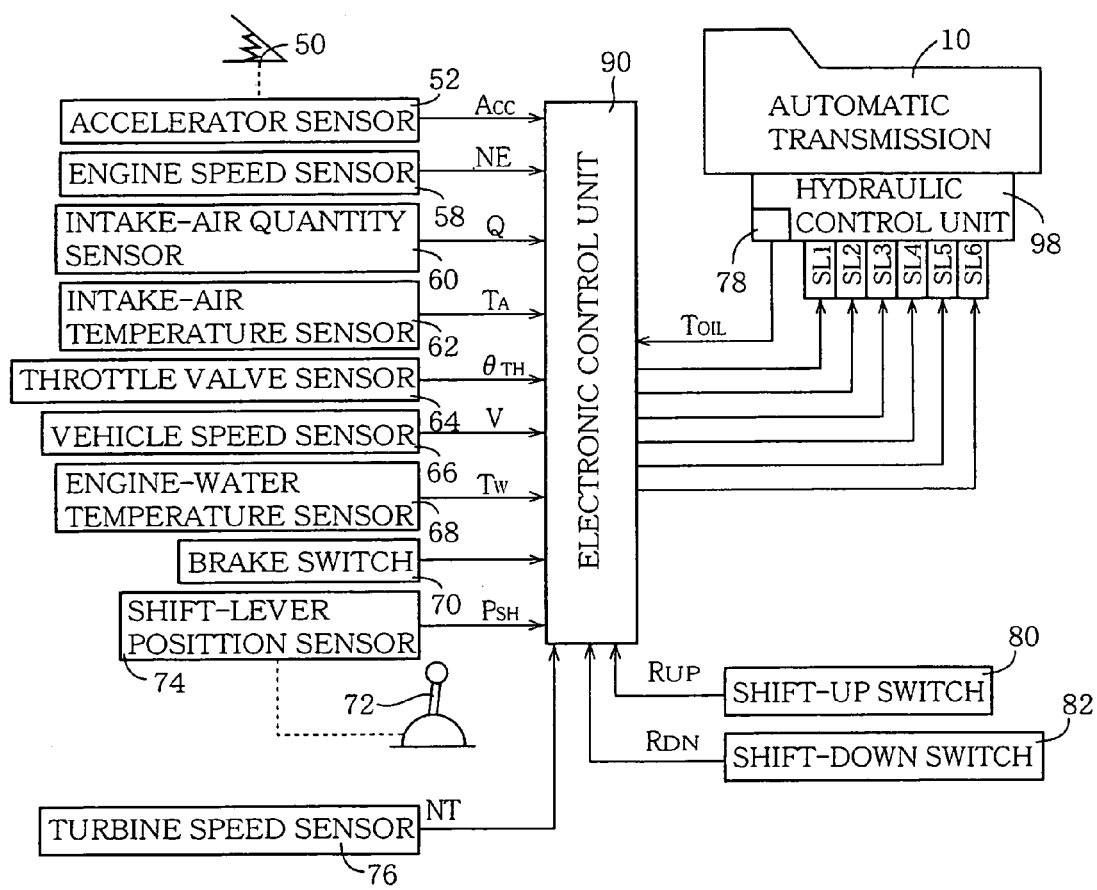
FIG. 3 is a block diagram showing major elements of a control system for controlling the vehicular automatic transmission of FIG. 1A.
Figure 4:
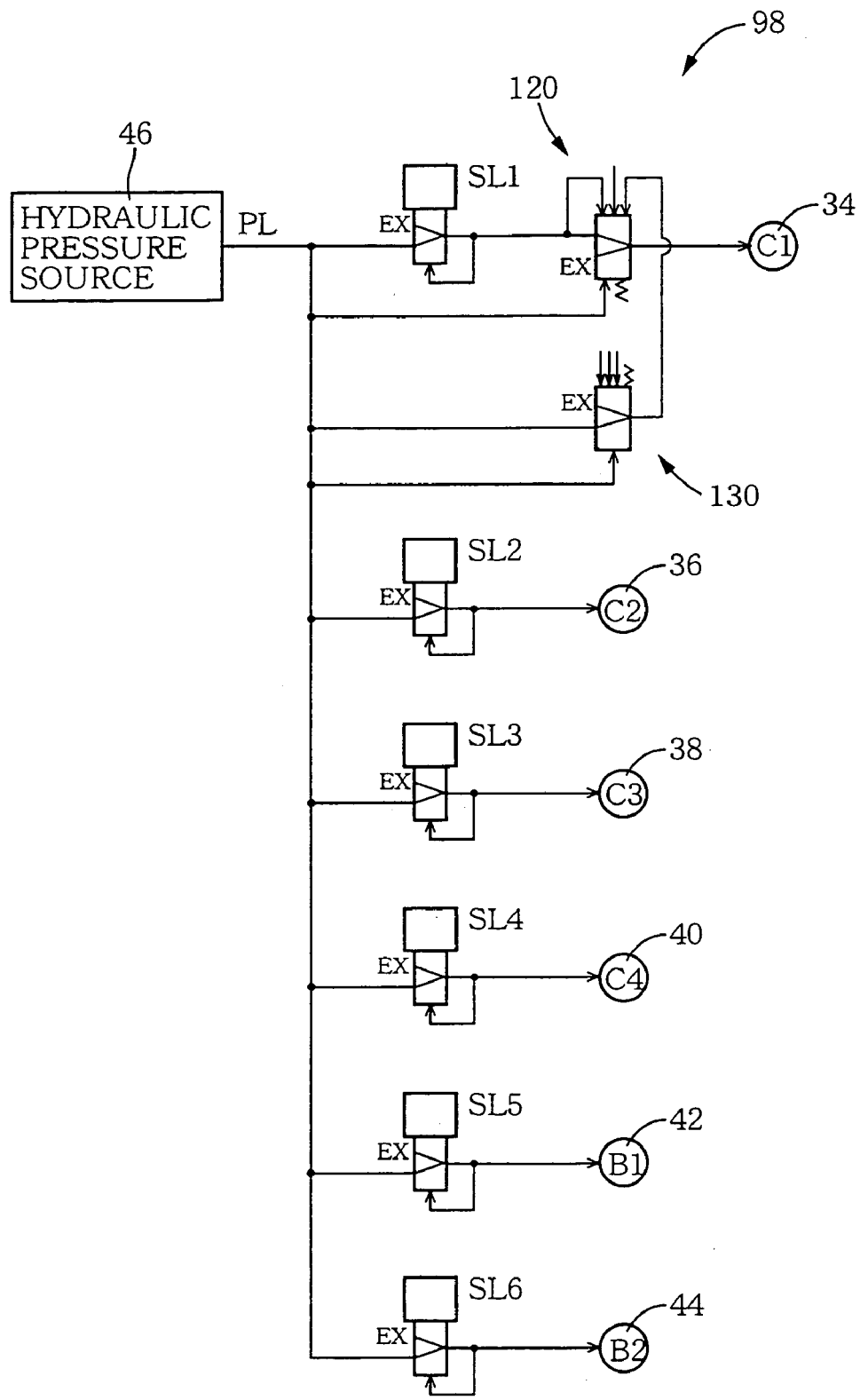
FIG. 4 is a hydraulic circuit diagram illustrating major elements of a hydraulic control unit shown in FIG. 3.

These clutches C1-C4 and brakes B1, B2 are engaged and released by energizing and de-energizing solenoid coils of respective linear solenoid valves SL1-SL6 incorporated in a hydraulic control unit 98 shown in the block diagram of FIG. 3, and transient fluid pressures of the clutches C and brakes B during their engaging and releasing actions are controlled by controlling the electric current applied to the solenoid coils. The hydraulic control diagram of FIG. 4 shows major elements of the hydraulic control unit 98, which include hydraulic actuators 34, 36, 38, 40, 42 and 44 in the form of hydraulic cylinders for the respective clutches C1-C4 and brakes B1 and B2. The hydraulic cylinders 34-44 are supplied with a pressurized working fluid having a line pressure PL, which is delivered from a hydraulic pressure source 46 and regulated by each of the linear solenoid valves SL1-SL6, so that the regulated fluid pressure is applied to the corresponding hydraulic actuator 34-44. The hydraulic pressure source 46 includes a mechanical type oil pump 48 (shown in FIG. 1A) driven by the engine 30, and a regulator valve operable to adjust the line pressure PL according to a load acting on the engine 30. The linear solenoid valves SL1-SL6 are shifting-control solenoid valves.

Referring to the block diagram of FIG. 3 illustrating a control system provided to control the automatic transmission 10 and other devices of the vehicle, the control system includes: an accelerator sensor 52 operable to detect a vehicle-operator's required output of the engine 30 in the form of an operating amount $A_{CC}$ of an accelerator pedal 50 functioning as a vehicle accelerating member; an engine speed sensor 58 operable to detect a speed $N_E$ of the engine 30; an intake-air quantity sensor 60 operable to detect an intake air quantity Q of the engine 30; an intake-air temperature sensor 62 operable to detect a temperature TA of the intake air; a throttle valve sensor 64 equipped with an engine idling switch, which is operable to detect an opening angle θTH of an electronic throttle valve, and a fully closed state of the electronic throttle valve (idling state of the engine 30); a vehicle speed sensor 66 operable to detect a running speed V of the vehicle (rotating speed $N_{OUT}$ of the output shaft 24); an engine-water temperature sensor 68 operable to detect a temperature $T_W$ of cooling water of the engine 30; a brake switch 70 operable to detect an operation of a service brake system of the vehicle; a sift-lever position sensor 74 operable to detect a presently selected position $P_{SH}$ of a manually operable member in the form of a shift lever 72; a turbine speed sensor 76 operable to detect a rotating speed NT of the turbine of the torque converter 32 (rotating speed $N_{IN}$ of the input shaft 22); an oil temperature sensor 78 operable to detect a temperature $T_{OIL}$ of the working fluid of the hydraulic control unit 98; a shift-up switch 80 operable to generate a shift-up command Rup for shifting up the automatic transmission 10; and a shift-down switch 82 operable to generate a shift-down command RDN for shifting down the automatic transmission 10. The electronic control unit 90 receives output signals of those sensors and switches indicative of the accelerator operating amount $A_{CC}$, engine speed $N_E$, intake-air quantity Q, intake-air temperature $T_A$, throttle opening angle $θ_{TH}$, vehicle speed V, engine water temperature $T_W$, operation of the service brake system, shift lever position $P_{SH}$, turbine speed NT, fluid temperature $T_{OIL}$, shift-up command $R_{UP}$ and shift-down command $R_{DN}$.

Figure 5:
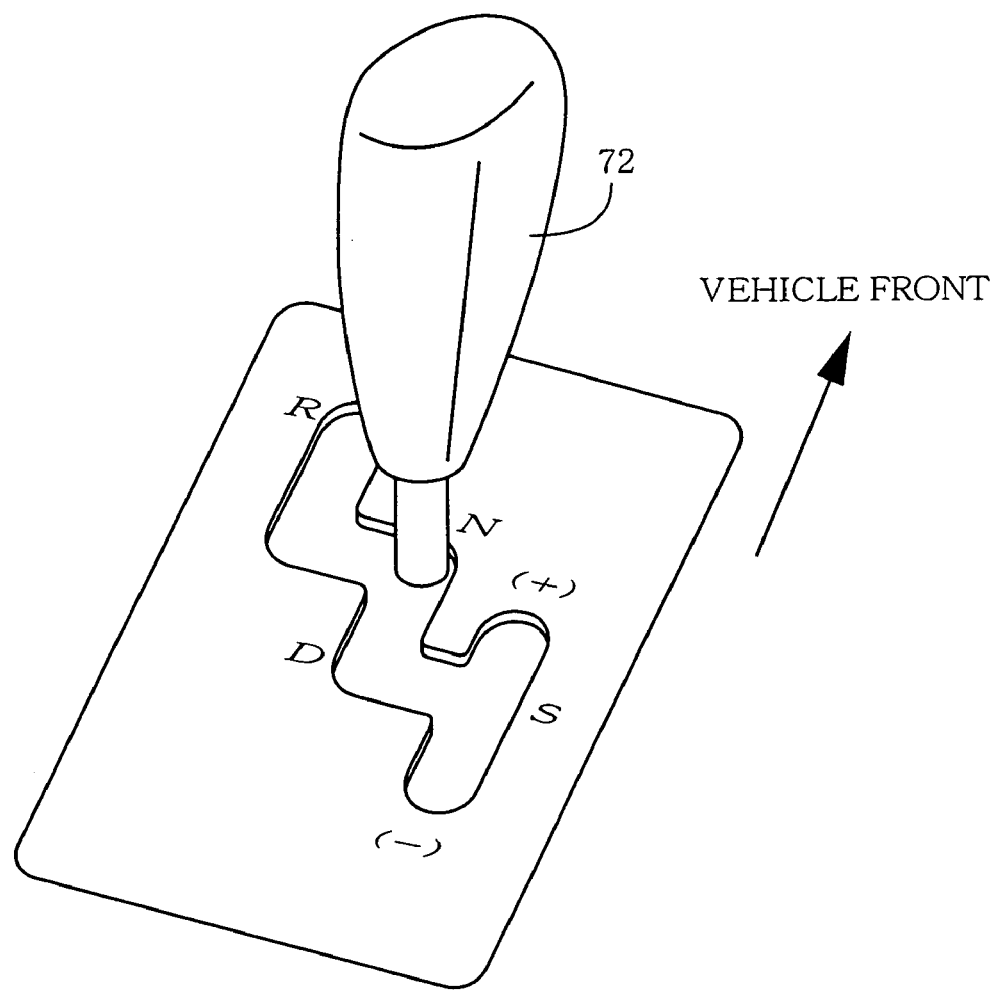
FIG. 5 is a perspective view illustrating one example of a shift lever shown in FIG. 3.
Figures 6, 7:
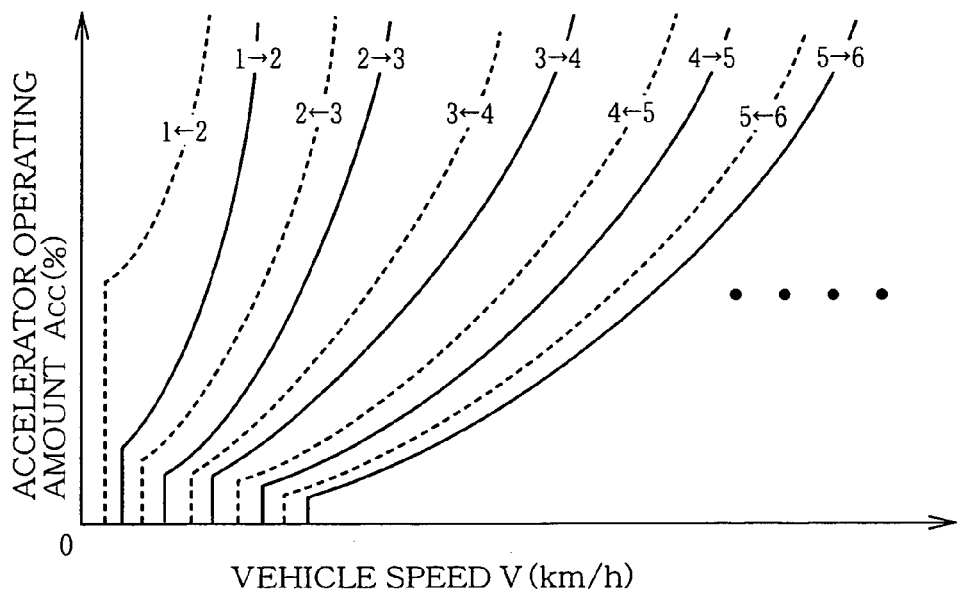
FIG. 6 is a view indicating an example of shift-up and shift-down boundary lines represented by a shifting boundary line map used for automatic shifting of the vehicular automatic transmission of FIG. 1A according to a running state of the vehicle.
FIG. 7 is a view indicating shift ranges of the vehicular automatic transmission which are selectively established by operating the shift lever.

The shift lever 72 is disposed near a vehicle-operator's seat of the vehicle, and has four positions: a reverse position R; neutral position N; a drive position D (automatic shifting position); and a sequential position S (manual shifting position), as shown in FIG. 6. The reverse position R is selected to drive the vehicle in the backward or reverse direction. In the neutral position N, vehicle drive power is not transmitted from the engine 30 to the drive wheels. The drive position D is selected to drive the vehicle in the forward direction with automatic shifting actions of the automatic transmission 10. The sequential position S is selected to drive the vehicle in the forward direction such that the automatic transmission 10 may be shifted up or down by operating the shift lever 72 from the sequential position S to a shift-up position "+" or a shift-down position "−" indicated in FIG. 5. As described below in detail by reference to FIG. 7, one of eight shift ranges L, 2-7 and D can be selected by operating the shift lever 72 to the shift-up position "+" or shift-down position "−", to select the number of the gear positions of the automatic transmission 10 available for automatic shifting. As indicated above, the shift-lever position sensor 74 detects the presently selected one of the positions R, N, D and S of the shift lever 72.

When the shift lever 72 is placed in the drive position (automatic shifting position) D or sequential position (manual shifting position) S, the vehicle is driven in the forward direction with an automatic shifting action of the automatic transmission 10 to an appropriate one of the eight forward drive gear positions "1st" through "8th". When an operation of the shift lever 72 to the drive position D is detected by the shift-lever position sensor 74, the electronic control unit 90 commands the hydraulic control unit 98 to place the automatic transmission 10 in an automatic shifting mode in which the automatic transmission 10 is automatically shiftable to any one of the eight forward-drive gear positions "1st" through "8th", with an appropriate combination of the engaged and released states of the clutches C and brakes B which is established by energization and de-energization of the linear solenoid valves SL1-SL6, on the basis of a running condition of the vehicle and according to a predetermined shifting rule in the form of a shifting boundary line map stored in a ROM of the electronic control unit 90. An example of the shifting boundary line map is illustrated in FIG. 6, which represents shift-up boundary lines indicated by solid lines, and shift-down boundary lines indicated by broken lines. Each boundary line represents a relationship between the vehicle speed V and the accelerator operating amount $A_{CC}$, which is determined such that the automatic transmission 10 is shifted down to increase the speed ratio, as the detected vehicle speed V is lowered at a given value of the accelerator operating amount $A_{CC}$, or as the detected accelerator operating amount $A_{CC}$ is increased at a given value of the vehicle speed V, as is apparent from FIG. 6. However, the parameters used for automatic shifting actions of the automatic transmission 10 are not limited to the vehicle speed V and the accelerator operating amount $A_{CC}$. For instance, the accelerator operating amount $A_{CC}$ may be replaced by the intake-air quantity Q, and a surface gradient of a roadway on which the vehicle is running may be used as one of the control parameters.

When an operation of the shift lever 72 to the sequential position (manual shifting position) S is detected by the shift-lever position sensor 74, the electronic control unit 90 commands the hydraulic control unit 98 to place the automatic transmission 10 in a manual shifting mode in which the automatic transmission 10 is automatically shiftable to any one of the forward-drive gear positions within one of the eight shift ranges L, 2-7 and D which is selected by operating the shift lever 72 to the shift-up or shift-down position "+" or "−". The shift-up and shift-down positions "+" and "−" are spaced apart from each other in the vehicle running direction, and the sequential position S is located between the shift-up and shift-down positions "+" and "−" in the vehicle running direction. The manual shifting mode is electrically established upon operation of the shift lever 72 to the sequential position S, to select the number of the gear positions available for automatic shifting of the automatic transmission 10. Described in greater detail, when an operation of the shift lever 72 to the shift-up position "+" or shift-down position "−" is detected by the shift-up switch 80, the shift-up command $R_{UP}$ is generated to change the presently established shift range to the new shift range in which the number of the gear positions available is larger by one than that of the presently established shift range. Accordingly, the shift-up command Rup changes the highest gear position (having the lowest speed ratio) available, in the direction of lowering the speed ratio, for example, from the fourth gear position "4th" to the fifth gear position "5th" when the shift lever 72 is operated from the sequential position S to the shift-up position "+". When an operation of the shift lever 72 to the shift-down position "−" is detected by the shift-down switch 82, the shift-down command RDN is generated to change the presently established shift range to the new shift range in which the number of the gear positions available is smaller by one than that of the presently established shift range. Accordingly, the shift-down command RDN changes the highest gear position available, in the direction of increasing the speed ratio, for example, from the fifth gear position "5th" to the fourth gear position "4th" when the shift lever 72 is operated from the sequential position S to the shift-down position "−". Thus, each time the shift lever 72 is operated to the shift-up position "+" or the shift-down position "−", the presently established one of the eighth shift ranges L, 2-7 and D is changed to the next adjacent shift range so that the number of the gear positions available for automatic shifting of the automatic transmission 10 is incremented or decremented, with a result of a change of the highest gear position available for the automatic shifting. Within the newly established shift range, the automatic transmission 10 is automatically shifted up or down depending upon the running condition of the vehicle and according to the shifting boundary line map of FIG. 6. When the shift lever 72 is repeatedly operated to the shift-down position "−" during running of the vehicle on a downhill road, the shift range is sequentially changed from the shift range 4 toward the shift range L, so that the automatic transmission. 10 may be sequentially shifted down from the fourth gear position "4th" toward the first gear position "1st", with a result of an increase of the engine braking force in steps. In the manual shifting mode, the first gear position "1st" is established by engaging the second brake B2 as well as the first clutch C1, so that an engine brake is applied to the vehicle in this first gear position.

The shift lever 72 is automatically returned from the shift-up position "+" or the shift-down position "−" back to the sequential position S, under a biasing action of biasing means such as a spring. While the shift range is changed according to the number of operations of the shift lever 72 to the shift-up or shift-down position "+", "−" in the illustrated embodiment, the shift range may be changed according to a time duration for which the shift lever 72 is held at the shift-up or shift-down position.

Referring back to the hydraulic circuit diagram of FIG. 4, the hydraulic control unit 98 includes a fail-safe valve 120 disposed between the first linear solenoid valve SL1 and the hydraulic actuator 34 for the first clutch C1. The fail-safe valve 120 is provided for draining an engaging pressure PC1 of the hydraulic actuator 34 to release the first clutch C1, for the purpose of preventing so-called "interlocking" of some combinations of the simultaneous engaging actions of the frictional coupling devices C, B which are not normally available but abnormally take place due to an electric failure or defect of the linear solenoid valves SL1-SL5 or an operational failure or defect of the linear solenoid valves SL1-SL5 such as sticking of their spools (operational abnormality due to a foreign matter caught in the valve structure). Those combinations are: (1) simultaneous engaging actions of the two frictional coupling devices (clutches C1 and C2) of the first group (to establish the fifth gear position 5th) and an engaging action of one of the frictional coupling devices (clutches C3, C4 and brake B1) of the second group; (2) simultaneous engaging actions of the second clutch C2 of the frictional coupling devices of the first group and one of the frictional coupling devices (clutches C3, C4 and brake B1) of the second group (to establish one of the sixth through eighth gear positions 6th-8th) and an engaging action of the first clutch C1 of the first group,; and (3) simultaneous engaging actions of the first clutch C1 of the first group and one of the frictional coupling devices (clutches C3, C4 and brake B1) of the second group (to establish one of the 2nd-4th gear positions) and an engaging action of the second clutch C2 of the first group. If the simultaneous engaging actions of those combinations of the frictional coupling devices C, B took place, the automatic transmission 10 would suffer from the interlocking of the simultaneous engaging actions of those combinations of the frictional coupling devices C, B. The interlocking would cause an undesirable variation of an output drive force of the automatic transmission 10 due to speed differences of the rotary elements associated with the frictional coupling devices in question, or an excessively large load acting on the friction members of the clutches C1-C4 or brake B1, resulting in deterioration of the durability of the friction members. To prevent this interlocking phenomenon, the fail-safe valve 120 is provided to release the first clutch C1 for preventing the simultaneous engaging actions of the above-indicated combinations of the frictional coupling devices.

The second brake B2 is engaged only when application of the engine brake (drive-power source brake) to the vehicle is required in the first gear position of the automatic transmission 10, and therefore the frequency of operation of this second brake B2 is relatively low. Accordingly, there is a relatively low possibility of interlocking of simultaneous engaging actions of this second brake B2 and any other frictional coupling device. In view of this fact, the brake B2 is excluded from the second group of frictional coupling devices as the object controlled by the fail-safe valve 120, in the present embodiment. Although the fail-safe valve 120 is disposed between the hydraulic actuator 34 for the first clutch C1 and the corresponding linear solenoid valve SL1, the fail-safe valve 120 may be disposed between the hydraulic actuator 36 for the second clutch C2 and the corresponding linear solenoid valve SL2. This modification also makes it possible to prevent the interlocking phenomenon.

Figure 8:
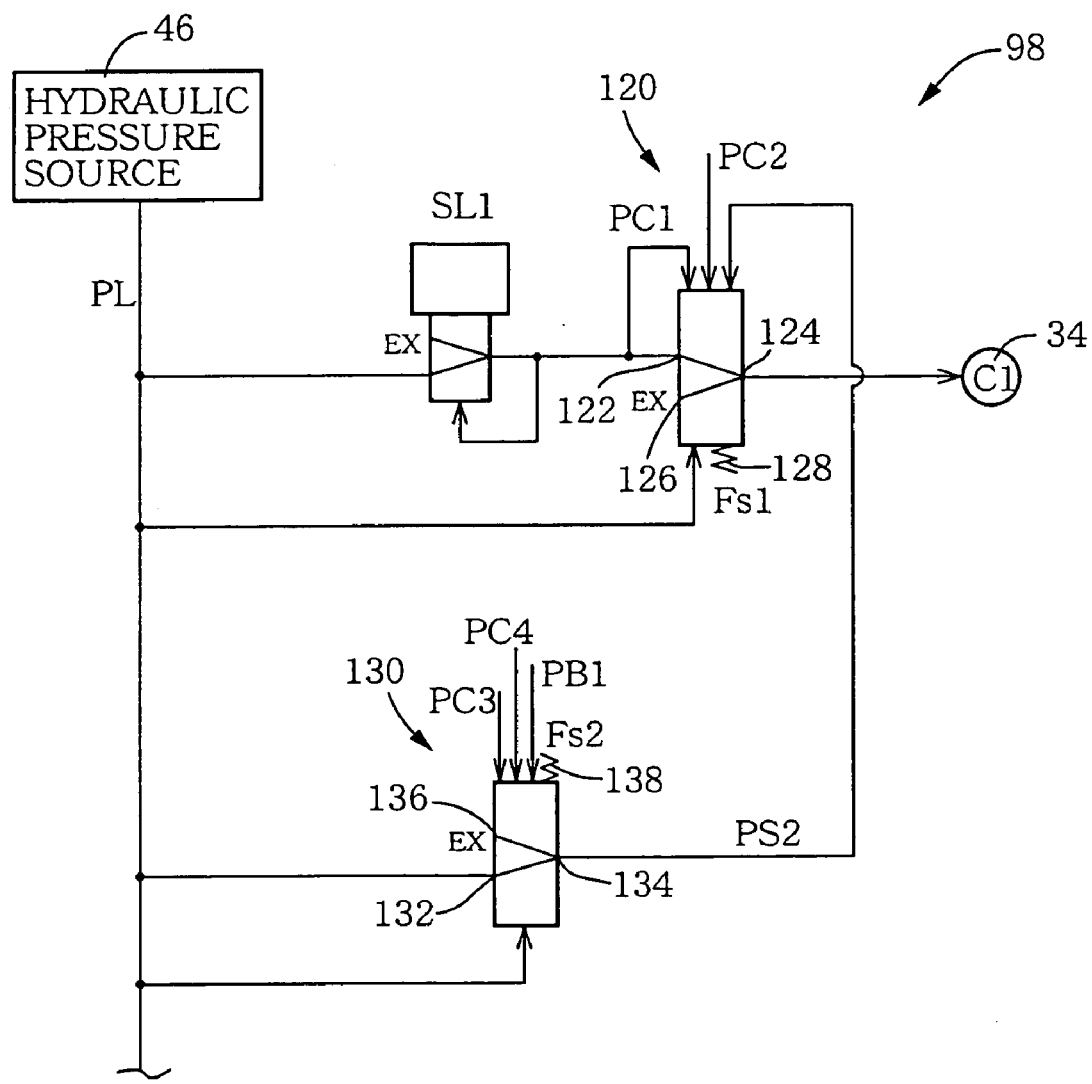
FIG. 8 is a hydraulic circuit diagram illustrating a fail-safe valve provided for a first clutch C1, and some elements located near the fail-safe valve, in the hydraulic control unit shown in FIG. 4.

The hydraulic circuit diagram of FIG. 8 shows in enlargement the fail-safe valve 120 and the elements located near the fail-safe valve 120. The fail-safe valve 120 has an input port 122 for receiving a hydraulic pressure from the linear solenoid valve SL1, an output port 124 communicating with the hydraulic actuator 34 for the first clutch C1, and a drain port 126 for draining the received hydraulic pressure, and includes a spool (not shown). The line pressure PL and a biasing force Fs1 of a spring 128 act on the spool in one of its opposite axial directions, while a first engaging hydraulic pressure PC1 of the first clutch C1 (output hydraulic pressure of the linear solenoid valve SL1), a second engaging hydraulic pressure PC2 of the second clutch C2 (output hydraulic pressure of the linear solenoid valve SL2) and a second-group-engaging pilot hydraulic pressure PS2 generated by a second-group-engaging switching valve 130 act on the spool in the other direction. Namely, the fail-safe valve 120 has four switching input ports which receives the line pressure PL, the first engaging hydraulic pressures PC1, PC2 and the second-group-engaging pilot hydraulic pressure PS2. The spool of the fail-safe valve 120 has four pressure-receiving portions which correspond to the respective four switching input ports and which have respective different diametric dimensions (respective different pressure-receiving surface areas). These four pressure-receiving portions respectively receive the line pressure PL, first engaging hydraulic pressures PC1, PC2 and second-group-engaging pilot hydraulic pressure PS2, such that a force based on the line pressure PL biases the spool in a first axial direction thereof while a force based on the other hydraulic pressures PC1, PC2, PS2 bias the spool in a second axial direction opposite to the first axial direction. The switching input port for receiving the second-group-engaging pilot hydraulic pressure PS2 is referred to as a pilot-pressure input port. It is noted that The hydraulic pressure source 46 generating the line pressure PL and the spring 128 cooperate to constitute biasing means for biasing the spool of the fail-safe valve 120 in the first axial direction.

When the first engaging hydraulic pressures PC1, PC2 and the second-group-engaging pilot hydraulic pressure PS2 are simultaneously applied to the fail-safe valve 120, the spool of the fail-safe valve 120 is moved in the second axial direction against a sum of the biasing force Fs1 of the spring 128 and the force based on the line pressure PL. As a result, the fail-safe valve 120 is placed in a fail-safe state in which the output port 124 and the drain port 126 are held in communication with each other while the input port 122 and the output port 124 are not in communication with each other, so that the hydraulic pressure of the hydraulic actuator 24 is drained or released through the output port 124 and drain port 126, whereby the first clutch C1 is released. When any one of the first engaging hydraulic pressures PC1, PC2 and second-group-engaging pilot hydraulic pressure PS2 is not applied to the fail-safe valve 120, the spool is moved in the first axial direction by the biasing force Fs1 and the force based on the line pressure PL. As a result, the fail-safe valve 120 is placed in a normal state in which the output port 124 and the input port 122 are held in communication with each other. Described in detail, the fail-safe valve 120 is placed in the fail-safe state to release the first clutch C1 when the first engaging hydraulic pressure PC2 and the second-group-engaging pilot hydraulic pressure PS2 are simultaneously applied to the fail-safe valve 120 while the first engaging hydraulic pressure PC1 for engaging the first clutch C1 is applied to the fail-safe valve 120. When only one of the fist engaging hydraulic pressure PC2 and second-group-engaging hydraulic pressure PS2 is applied to the fail-safe valve 120 during application of the first engaging hydraulic pressure PC1 to the fail-safe valve 120, however, the fail-safe valve 120 is placed in the normal state to permit the engaging action of the first clutch C1. While the first engaging hydraulic pressure PC1 is not applied to the fail-safe valve 120, the first clutch C1 is in its released state, so that there is no interlocking involving the first clutch C1. Accordingly, the fail-safe valve 120 remains in the normal state even when the first engaging hydraulic pressure PC2 and second-group-engaging pilot hydraulic pressure PS2 are simultaneously applied to the fail-safe valve 120, as long as the first engaging hydraulic pressure PC1 is not applied to the fail-safe valve 120.

The second-group-engaging switching valve 130 has an input port 132 for receiving the line pressure PL, an output port 134 communicating with the fail-safe valve 120, and a drain port 136 for draining the received hydraulic pressure, and includes a spool (not shown). A second engaging hydraulic pressure PC2 of the third clutch C3 (output hydraulic pressure of the linear solenoid valve SL3), a second engaging hydraulic pressure PC4 of the fourth clutch C4 (output hydraulic pressure of the linear solenoid valve SL4), a second engaging hydraulic pressure PB1 of the first brake B1 (output hydraulic pressure of the linear solenoid valve SL5) and a biasing force Fs2 of a spring 138 act on the spool of the second-group-engaging switching valve 130 in one of its opposite axial directions, while a force based on the line pressure PL acts on the spool in the other axial direction. Namely, the second-group-engaging switching valve 130 has four switching input ports which receives the line pressure PL, the second engaging hydraulic pressures PC3, PC4 and PB1. The spool of the second-group-engaging switching valve 130 has four pressure-receiving portions which correspond to the respective four switching input ports and which have respective different diametric dimensions (respective different pressure-receiving surface areas). These four pressure-receiving portions respectively receive the line pressure PL and second engaging hydraulic pressures PC3, PC4, PB1, such that a force based on the second engaging hydraulic pressures PC3, PC4, PB1 biases the spool in a first axial direction while a force based on the line pressure PL biases the spool in a second axial direction opposite to the first axial direction. The hydraulic pressure source 46 generating the line pressure PL functions as biasing means for biasing the spool in the second direction.

When any one of the second engaging hydraulic pressures PC3, PC4, PB1 is applied to the second-group-engaging switching valve 130, the spool of this switching valve 130 is moved in the first axial direction against the force based on the line pressure PL, and the switching valve 130 is placed in a pilot-pressure generating state in which the input port 132 and the output port 134 are held in communication with each other, while the drain port 136 is not in communication with the output port 134, so that the line pressure PL is applied as the second-group-engaging pilot hydraulic pressure PS2 to the fail-safe valve 120. When none of the second engaging hydraulic pressures PC3, PC4, PB1 is applied to the second-group-engaging switching valve 130, the spool of this switch valve 130 is moved in the second axial direction by the force based on the line pressure PL, against the biasing force Fs2 of the spring 138, so that the switching valve 130 is placed in a pilot-pressure non-generating state in which the output port 134 and the drain port 136 are held in communication with each other while the input port 132 is not in communication with the output port 134, whereby the second-group-engaging pilot hydraulic pressure PS2 is not generated by the switching valve 130.

In the present embodiment, the hydraulic control apparatus for controlling the vehicular automatic transmission 10 includes the fail-safe valve 120 and the second-group-engaging switching valve 130, and is arranged such that the second-group-engaging switching valve 130 is arranged to receive second engaging hydraulic pressures PC3, PC4, PB1 generated to engage the plurality of hydraulically operated frictional coupling devices C3, C4, B1 of the second group, and is operable, upon reception of at least one of those second engaging hydraulic pressures PC3, PC4, PB1, to generate the second-group-engaging pilot hydraulic pressure PS2 to be applied to the fail-safe valve 120, and further such that the fail-safe valve 120 is switched from the normal state to the fail-safe state to prevent application of the first engaging hydraulic pressure PC1 to the hydraulic actuator 34, for thereby releasing the first clutch C1, when the fail-safe valve 120 simultaneously receives the first engaging hydraulic pressure PC2 generated to engage the second clutch C2 and the second-group-engaging pilot hydraulic pressure PS2. Accordingly, the present hydraulic control apparatus prevents the interlocking of the simultaneous engaging actions of the first and second clutches C1, C2 of the first group and at least one of the clutches C3, C4 and brake B1 of the second group.

In the present hydraulic control apparatus, the second engaging hydraulic pressures PC3, PC4, PB1 of the frictional coupling devices C3, C4, B1 of the second group are all applied to the second-group-engaging switching valve 130, while the second-group-engaging pilot hydraulic pressure PS2 generated from the switching valve 130 is applied to the fail-safe valve 120, so that the number of the required switching input ports of the fail-safe valve 120 is relatively small, whereby the required diametric dimension and/or axial length of the fail-safe valve 120 can be reduced, with a result of reduction of the sliding resistance of the spool and consequent improvement of the operating response and increased resistance to sticking of its spool. Although the second-group-engaging switching valve 130 is required in addition to the fail-safe valve 120, these valves 120, 130 are operated independently of each other according to the different hydraulic pressures, so the required diameter and axial length of each valve 120, 130 can be reduced, whereby the fail-safe arrangement including these two valves 120, 130 has an improved operating response and an increased resistance to the sticking of the spools.

In the present embodiment, the three hydraulically operated frictional coupling devices C3, C4 and B1 constitute the second group, but only the second-group-engaging pilot hydraulic pressure PS2 generated by the second-group-engaging switching valve 130 is applied to the fail-safe valve 130. Namely, the fail-safe valve 120 need not receive the three second engaging hydraulic pressures PC3, PC4, PB1 from the respective frictional coupling devices C3, C4, B1, so that the number of the required switching input ports of the fail-safe valve 120 can be reduced, making it possible to reduce the required diameter and length of the fail-safe valve 120.

The fail-safe valve 120 can be used for different configurations of the automatic transmission which have respective different numbers of the gear positions and respective different numbers of the hydraulically operated frictional coupling devices, so that the cost of manufacture of the hydraulic control apparatus including the fail-safe device 120 can be reduced.

Figure 9:
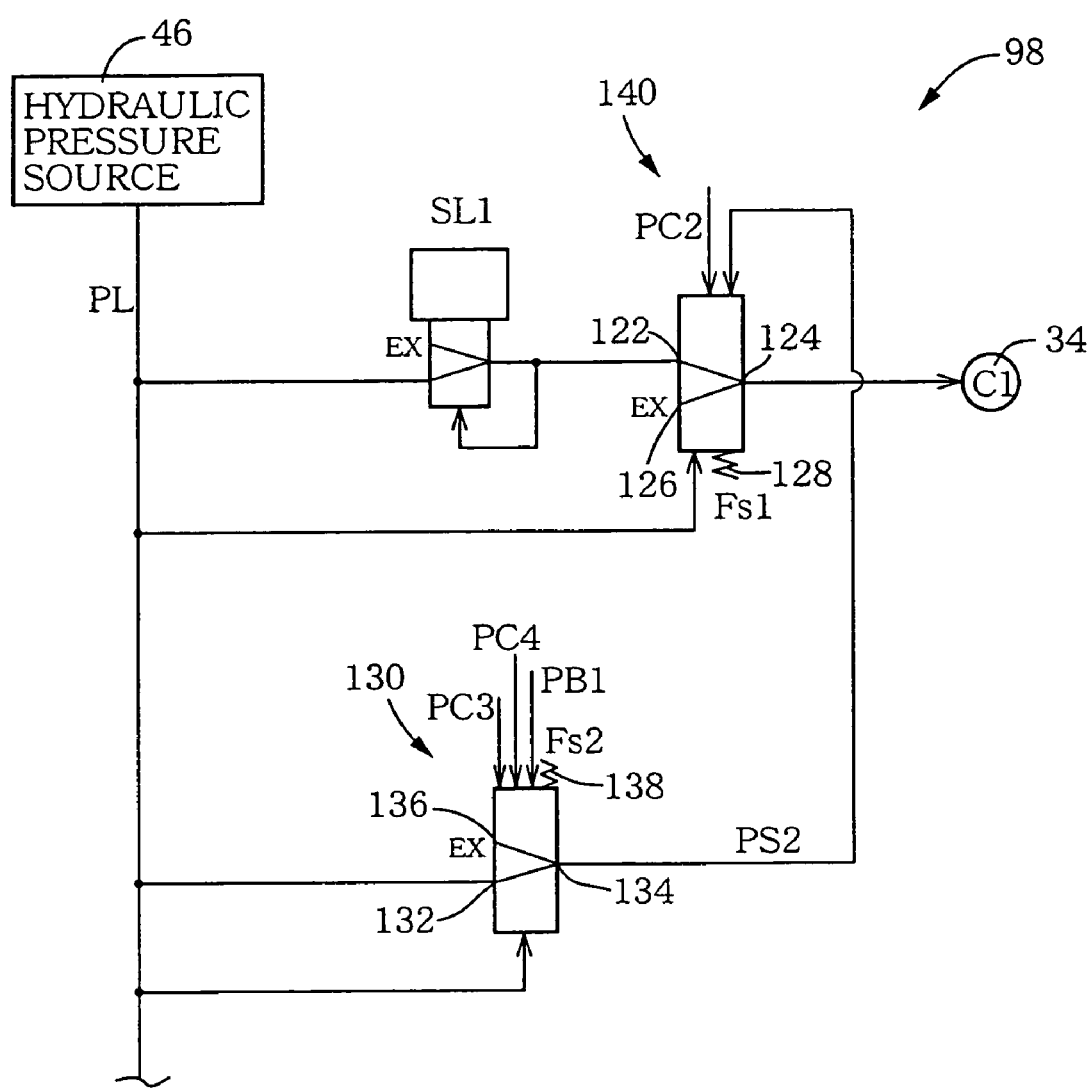
FIG. 9 is a hydraulic circuit diagram illustrating a fail-safe valve provided for the first clutch C1, in another embodiment of this invention.

In the first embodiment which has been described, the fail-safe valve 120 is placed in the fail-safe position with the axial movement of the spool in the second direction against the force based on the line pressure PL when the fail-safe valve 120 simultaneously receives the first engaging hydraulic pressures PC1 and PC2 and the second-group-engaging pilot hydraulic pressure PS2. However, the application of the first engaging hydraulic pressure PC1 to the fail-safe valve 120 is not essential for the fails-safe valve 120 to be placed in its fail-safe position. An example of a hydraulic control apparatus according to this modification is shown in FIG. 9. This hydraulic control apparatus includes a fail-safe valve 140 which is placed in the fail-safe state when the fail-safe valve 140 receives only the first engaging hydraulic pressure PC2 in addition to the second-group-engaging pilot hydraulic pressure PS2. Described in detail, when the fail-safe valve 140 does not receive both of the first engaging hydraulic pressure PC2 and the second-group-engaging pilot hydraulic pressure PS2, the spool of the fail-safe valve 140 is moved in the first axial direction by the force based on the line pressure PL and the biasing force Fs1 of the spring 128, so that the fail-safe valve 140 is placed in the normal state in which the first engaging hydraulic pressure PC1 received from the linear solenoid valve SL1 is applied to the hydraulic actuator 34 for the first clutch C1. When the fail-safe device 140 simultaneously receives both the first engaging hydraulic pressure PC2 and the second-group-engaging pilot hydraulic pressure PS2, the spool of the fail-safe valve 140 is moved in the second axial direction against the force based on the line pressure PL and the biasing force Fs1, irrespective of whether the first engaging hydraulic pressure PC1 is applied to the fail-safe valve 140 or not, so that the fail-safe valve 140 is placed in the fail-safe state in which the output port 124 and the drain port 126 are held in communication with each other while the input port 122 is not in communication with output port 124, whereby the application of the first engaging hydraulic pressure PC1 to the hydraulic actuator 34 is prevented. In other words, the fail-safe valve 140 is placed in the fail-safe state when the automatic transmission 10 is placed in any one of the sixth through eighth gear positions 6th-8th, with the first clutch C1 held in its released state. This arrangement prevents an abnormal engaging action of the first clutch C1, to thereby prevent the interlocking of the simultaneous engaging actions of the first clutch C1 and any one of the frictional coupling devices PC3, PC4, PB1 of the second group. When the fail-safe valve 140 abnormally receives the second-group-engaging pilot hydraulic pressure PS2 in addition to the first engaging hydraulic pressure PC2 while the automatic transmission 10 is placed in any one of the first through fifth gear 1st-5th, with the first clutch C1 held in its engaged state, the fail-safe valve 140 is placed in the fail-safe state, to release the first clutch C1, for preventing the interlocking of the simultaneous engaging actions of the first clutch C1 and any one of the frictional coupling devices PC3, PC4, PB1 of the second group.

While the preferred embodiment of this invention have been described above in detail by reference to the drawings, for illustrative purpose only, it is to be understood that the present invention may be embodied with various changes, modifications and improvements, which may occur to those skilled in the art, in the light of the foregoing teachings.

What is claimed is:

1. A hydraulic control apparatus for controlling an automatic transmission which includes two hydraulically operated frictional coupling devices of a first group and a plurality of hydraulically operated frictional coupling devices of a second group, and which is arranged to establish a selected one of a plurality of gear positions thereof having respective different speed ratios, by simultaneous engaging actions of the two frictional coupling devices of the first group, or simultaneous engaging actions of one of the frictional coupling devices of the first group and one of the frictional coupling devices of the second group, said hydraulic control apparatus comprising:

a second-group-engaging switching valve which is arranged to receive a plurality of second engaging hydraulic pressures generated to respectively engage the plurality of hydraulically operated frictional coupling devices of the second group and which is operable, upon reception of at least one of said second engaging hydraulic pressures, to generate a second-group-engaging pilot hydraulic pressure other than said at least one of said second engaging hydraulic pressures; and a fail-safe valve which is arranged to receive at least one of two first engaging hydraulic pressures generated to respectively engage the two hydraulically operated frictional coupling devices of the first group and which is operable, upon simultaneous reception of the first engaging hydraulic pressure generated to engage one of said two frictional coupling devices of the first group and said second-group-engaging pilot hydraulic pressure, to prevent application of the first engaging hydraulic pressure to the other of said two frictional coupling devices of the first group.

2. The hydraulic control apparatus according to claim 1, wherein said plurality of hydraulically operated frictional coupling devices of the second group consist of at least three frictional coupling devices including at least one frictional coupling device an engaging action of which simultaneously with engaging actions of said two hydraulically operated frictional coupling devices of the first group would cause interlocking of the simultaneous engaging actions of said at least one frictional coupling device of the second group and said two hydraulically operated frictional coupling devices of the first group, said second-group-engaging switching valve generating said second-group-engaging pilot hydraulic pressure when said second-group-engaging switch valve receives at least one of at least three second engaging hydraulic pressures generated to respectively engage said at least three frictional coupling devices of the second group.

3. The hydraulic control apparatus according to claim 1, wherein said fail-safe valve prevents the application of the first engaging hydraulic pressure to said other of said two frictional coupling devices of the first group, for releasing said other frictional coupling device, when the first engaging hydraulic pressure generated to engage said one of said two frictional coupling devices of the first group and said second-group-engaging pilot hydraulic pressure are simultaneously applied to said fail-safe valve while the first engaging hydraulic pressure is generated to engage said other frictional coupling device of the first group and applied to said fail-safe device.

4. The hydraulic control apparatus according to claim 3, wherein said fail-safe device has a spool movable in opposite first and second axial directions and is arranged to receive the first engaging hydraulic pressure generated to engage said other of said two hydraulically operated frictional coupling devices of the first group in addition to the first engaging hydraulic pressure generated to engage said one of said two hydraulically operated frictional coupling devices of the first group and said second-group-engaging pilot hydraulic pressure, said spool of said fail-safe valve being moved in said second axial direction to place said fail-safe valve in a fail-safe state to prevent the application of the first engaging hydraulic pressure to said other frictional coupling device of the first group, when said fail-safe valve simultaneously receives the first engaging hydraulic pressures generated to engage said one and other frictional coupling devices of the first group and said second-group-engaging pilot hydraulic pressure.

5. The hydraulic control apparatus according to claim 1, wherein said plurality of gear positions of said automatic transmission include first through eighth gear positions, and said other of said two hydraulically operated frictional coupling devices of the first group is a first clutch which is engaged to establish the first through fifth gear positions, and said one of said two hydraulically operated frictional coupling devices of the first group is a second clutch which is engaged to establish the fifth through eighth gear positions, while said plurality of hydraulically operated frictional coupling devices of the second group include at least a third clutch which is engaged to establish the third and seventh gear positions, a fourth clutch which is engaged to establish the fourth and sixth gear positions, and a first brake which is engaged to establish the second and eighth gear positions.

6. The hydraulic control apparatus according to claim 5, wherein said automatic transmission includes (a) a first transmission portion constituted principally by a first planetary gear set having a first sun gear, a first carrier and a first ring gear, and (b) a second transmission portion constituted principally by a second planetary gear set having a second sun gear, a second carrier and a second ring gear, and a third planetary gear set having a third sun gear, a third carrier and a third ring gear, and wherein one of said first sun gear, first carrier and first ring gear is fixed to a stationary member, and another of said first sun gear, first carrier and first ring gear is fixed to an input member of the automatic transmission, while a remainder of said first sun gear, first carrier and first ring gear functioning as a decelerating output member a speed of which is reduced with respect to a speed of said input member, selected ones of said second and third sun gears, said second and third carriers and said second and third ring gears being connected to each other so as to provide first through fourth rotary elements, said first rotary element being selectively fixed to said stationary member through said first brake, said second rotary element being selectively fixed to said stationary member through a second brake which is engaged to establish the first gear position, said fourth rotary element being selectively connected to said decelerating output member through said first clutch, said second rotary element being selectively connected to said input member through said second clutch, said first rotary element being selectively connected to said decelerating output member through said third clutch and selectively connected to said input member through said fourth clutch, said third rotary element being fixed to said decelerating output member.

7. The hydraulic control apparatus according to claim 6, wherein said first planetary gear set of said first transmission portion is a planetary gear set of a double-pinion type wherein one of the first sun gear and the first carrier is fixed to said stationary member and the other of the first sun and the first carrier is fixed to said input member, while the first ring gear functions as said decelerating output member the speed of which is reduced with respect to that of said input member.

8. The hydraulic control apparatus according to claim 6, wherein said second and third planetary gear sets of said second transmission portion are respectively a planetary gear set of a single-pinion type and a planetary gear set of a double-pinion type, and said first rotary element is constituted by the second sun gear of the second planetary gear set, and the second carrier of the second planetary gear set and the third carrier of the third planetary gear set are fixed to each other and cooperate to constitute said second rotary element, the second ring gear of the second planetary gear set and the third ring gear of the third planetary gear set being fixed to each other and cooperating to constitute said third rotary element, said fourth rotary element being constituted by the third sun gear of the third planetary gear set.

9. The hydraulic control apparatus according to claim 1, wherein said fail-safe valve is connected to said other of said two hydraulically operated frictional coupling devices of the first group, and has an input port for receiving the first engaging hydraulic pressure generated to engage said other frictional coupling device, an output port through which the received first engaging hydraulic pressure is applied to said other frictional coupling device, and a drain port for draining the received first engaging hydraulic pressure, said fail-safe valve being switchable between a normal state in which said input port and said output port are held in communication with each other for permitting the application of the received first engaging hydraulic pressure to said other frictional coupling device while said drain port is not held in communication with said output port, and a fail-safe state in which said output port and said drain port are held in communication with each other for draining the received first engaging hydraulic pressure to release said other frictional coupling device while said input port is not held in communication with said output port.

10. The hydraulic control apparatus according to claim 9, wherein said fail-safe valve includes a spool movable in opposite first and second axial directions, and biasing means for biasing said spool in said first axial direction, and has a switching input port for receiving the first engaging hydraulic pressure generated to engage said one of said two hydraulically operated frictional coupling devices of the first group, such that the received first engaging pressure acts on said spool in said second axial direction, and a pilot-pressure input port for receiving said second-group-engaging pilot hydraulic pressure such that the received second-group-engaging pilot hydraulic pressure acts on said spool in said second direction, said fail-safe valve being normally held in said normal state under a biasing action of said biasing means, and switched to said fail-safe state upon a movement of said spool in said second direction against the biasing action of said biasing means.

11. The hydraulic control apparatus according to claim 1, wherein said fail-safe device has a spool movable in opposite first and second axial directions and is arranged to receive the first engaging hydraulic pressure generated to engage said one of said two hydraulically operated frictional coupling devices of the first group and said second-group-engaging pilot hydraulic pressure, said spool of said fail-safe valve being moved in said second axial direction to place said fail-safe valve in a fail-safe state to prevent the application of the first engaging hydraulic pressure to said other frictional coupling device of the first group, irrespective of whether the first engaging hydraulic pressure is generated to engage said other frictional coupling device of the first group or not, when said fail-safe valve simultaneously receives the first engaging hydraulic pressures generated to engage said one frictional coupling devices of the first group and said second-group-engaging pilot hydraulic pressure.

12. The hydraulic control apparatus according to claim 1, wherein said second-group-engaging switching valve has an input port for receiving an input hydraulic pressure, an output port through which the received input hydraulic pressure is applied as said second-group-engaging pilot hydraulic pressure to said fail-safe valve, and a drain port for draining the received input hydraulic pressure, said second-group-engaging switching valve being switchable between a pilot-pressure generating state in which said input port and said output port are held in communication with each other to apply said second-group-engaging pilot hydraulic pressure to said fail-safe valve while said drain port is not held in communication with said output port, and a pilot-pressure non-generating state in which said output port and said drain port are held in communication with each other for draining said second-group-engaging pilot hydraulic pressure while said input port is not held in communication with said output port.

13. The hydraulic control apparatus according to claim 12, wherein said second-group-engaging switching valve includes a spool movable in opposite first and second axial directions, and biasing means for biasing said spool in said first axial direction, and has a plurality of switching input ports for receiving said plurality of second engaging hydraulic pressures such that the received second engaging hydraulic pressures act on said spool in said first axial direction, said second-group-engaging switching valve being switched to said pilot-pressure non-generating state with a movement of said spool in said second axial direction by a biasing force of said biasing means when none of said second engaging hydraulic pressures is applied to said second-group-engaging switching valve, and switched to said pilot-pressure generating state with a movement of said spool in said first axial direction against the biasing force of said biasing means when at least one of said second engaging hydraulic pressures is applied to said second-group-engaging switching valve.

* * * * *